TRANSISTORIZED AUTOMOBILE RADIO

Filed Dec. 1, 1960 3 Sheets-Sheet 1

INVENTOR.
JOHN S. DE METRICK
BY
Ezekiel Wolf, Wolf & Greenfield
ATTORNEYS

Jan. 2, 1962 J. S. DE METRICK 3,015,726

TRANSISTORIZED AUTOMOBILE RADIO

Filed Dec. 1, 1960 3 Sheets-Sheet 2

*INVENTOR.*

JOHN S. DE METRICK

*BY*

Ezekiel Wolf, Wolf + Greenfield

ATTORNEYS

INVENTOR.
JOHN S. DE METRICK
BY
Ezekiel Wolf, Wolf & Greenfield
ATTORNEYS

United States Patent Office 3,015,726

Patented Jan. 2, 1962

3,015,726

TRANSISTORIZED AUTOMOBILE RADIO

John S. De Metrick, Lexington, Mass., assignor to Automatic Radio Mfg. Co., Inc., Boston, Mass., a corporation of Massachusetts Filed Dec. 1, 1960, Ser. No. 73,083
9 Claims. (Cl. 250—20)

The present invention relates in general to transistorized automobile radio receivers and more particularly concerns a novel fully-transistorized radio receiver which is rugged, sensitive, selective, relatively easy to produce by mass production techniques, inexpensive and easy to service when service is required, yet exceptionally low in cost. The layout of the radio receiver according to the invention facilitates shielding sensitive circuits with a minimum of conducting material so that the receiver is relatively insensitive to ignition noise and other electrical disturbances.

The electrical circuit diagram of the inventive physical arrangement of circuit components is known in the art. However, prior art receivers generally employ transistors removably seated in sockets. Removable transistors present a problem because the severe vibration encountered by an automobile radio increases the chances that good electrical contact between transistor and associated circuit components connected to the socket will be permanently or intermittently interrupted. This difficulty may be reduced by adding a suitable clamp. But the use of a socket and an additional holding clamp adds to the cost of the finished receiver.

Another disadvantage of prior art receivers arises from the use of printed circuit boards. While these boards reduce initial assembly costs, they are often unable to withstand the severe vibration and shock frequently encountered by automobile radios. Hence, failures are not infrequent. And when the failures occur, repair is difficult.

Accordingly, it is an important object of the present invention to provide a fully-transistorized automobile radio receiver exhibiting high performance with great reliability in the presence of severe mechanical vibrations, yet is low in cost and relatively easy to assemble and repair when trouble develops.

It is another object of the invention to provide a radio receiver in accordance with the preceding object which occupies a relatively small overall volume despite the uncrowded arrangement of circuit components facilitating initial assembly and repairs, when necessary.

It is still a further object of the invention to arrange transistors with associated electronic circuit components so that effective electrical shielding is readily accomplished with a minimum of conducting shielding material.

It is a further object of the invention to secure transistors and other circuit components in place so that the period of reliable operation is maximized.

According to the invention, the novel receiver comprises a chassis of substantially rigid conducting material having a top plate of relatively large area and a plurality of smaller area side plates generally perpendicular to and on the underside of said top plate for enclosing all but one side of an electrically shielded volume defined by said chassis. A center row of terminals extends from the top plate underside substantially along the lengthwise center line thereof along most of the length of the top plate. At least one other row of terminals extends from the top plate underside generally parallel to said center row for less than half the length of the plate. Shielded I.-F. transformers all extend from the top side of the top plate with only the terminals of said transformers extending from the top plate underside. The I.-F. transformer terminals are separated from said one other row by said center row. The transistors in radio frequency circuits and associated electronic circuit components interconnect the different terminals so that all the radio frequency circuit transistors are within the shielded volume. A bottom conducting plate is secured to the side plates to fully enclose the said shielded volume and thereby minimize receiver response to ignition noise and other types of interference.

Numerous other features, objects and advantages of the invention will become apparent from the following specification when read in connection with the accompanying drawing in which.

Figure 1:
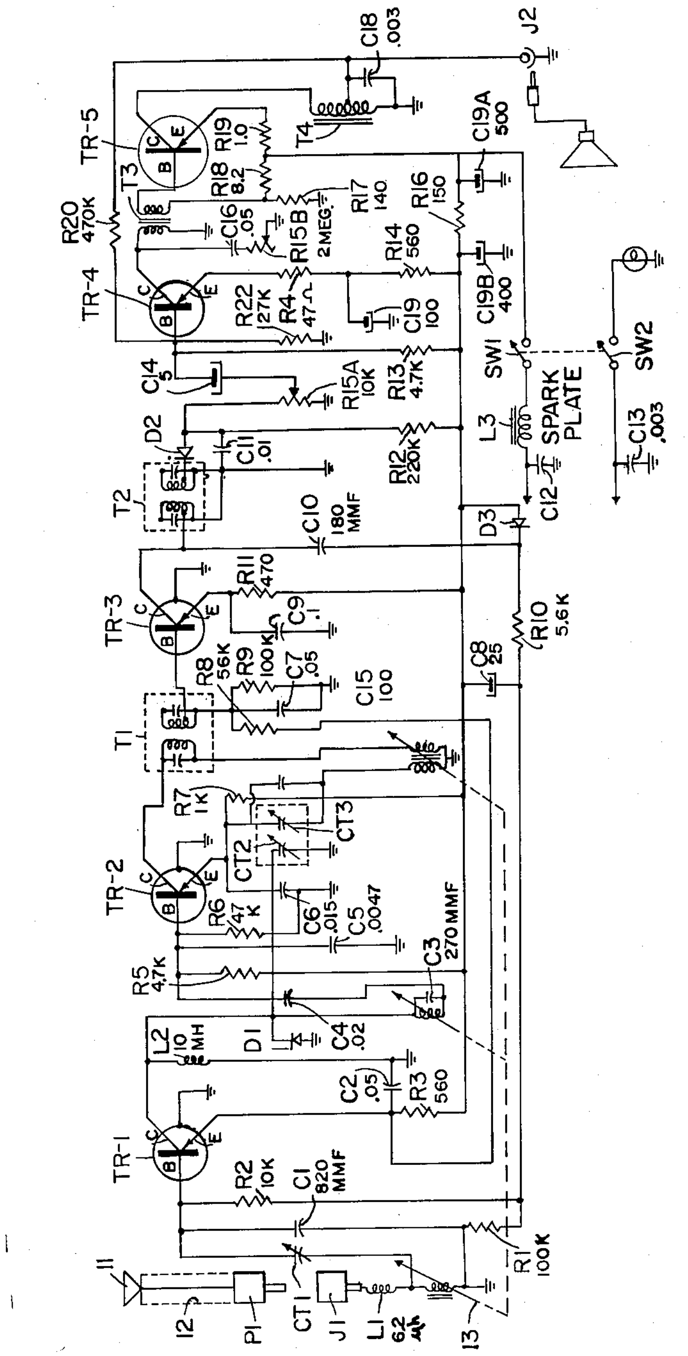
FIG. 1 is a schematic circuit diagram of a preferred prior art circuit embodied by the layout according to the invention.

Referring to FIG. 1, there is illustrated a schematic circuit diagram of the circuits arranged according to the invention. Since the electrical circuit itself is known in the prior art, it will be described only briefly. Each circuit component is identified in FIG. 1 by the same reference symbol used in the pictorial views of FIGS. 2 and 3 to clarify the relationship of the physical elements pictorially represented in FIGS. 2 and 3 in the radio receiver circuit. In addition, representative circuit parameters are set forth in the schematic circuit diagram of FIG. 1 as illustrative of the best mode now contemplated for practicing the invention.

A signal is received by the automobile antenna 11 and transmitted over coaxial cable 12 to a plug P1 which mates with jack J1 for coupling the signal into the antenna input circuit for the R.-F. amplifier stage comprising transistor TR–1 and associated circuit components. The amplified signal from the first R.-F. stage is applied to the oscillator-mixer stage comprising transistor TR–2 and associated circuit components. It will be observed that the ganged inductors 13 simultaneously tune the input and output tuned circuits of theh R.-F. amplifier stage and the oscillator stage to insure proper tracking. This ganged tuning device is preferably a standard push-button tuning assembly commonly used in automobile receivers permitting manual tuning or push-button selection of any of a number of different stations.

The first I.-F. transformer T1 couples the output of the mixer-oscillator stage to the input of the I.-F. amplifier stage comprising transistor TR–3 and associated circuit components. The output of the I.-F. amplifier stage is coupled by I.-F. transformer T2 to the detector comprising diode D2 and associated circuit components.

Diode D3 rectifies energy received from a tap on the primary of transformer T2 for developing an AVC signal at low impedance for delivery to the base of transistor TR–1. Diode D1 prevents the oscillator-mixer stage from being overloaded by strong signals because that diode is rendered conductive to effectively lower the load impedance in the collector circuit of transistor TR–1 in the presence of strong signals and thereby lower the gain of the first R.-F. stage.

The detected signal from diode D2 is coupled to the first audio amplifier comprising transistor TR–4 and associated cricuit components. The output of the first audio amplifier stage is coupled by transformer T3 to the power output stage comprising transistor TR–5 and associated circuit components. The output of the latter stage is coupled to the loudspeaker through auto-transformer T4 and jack J2.

Figure 2:
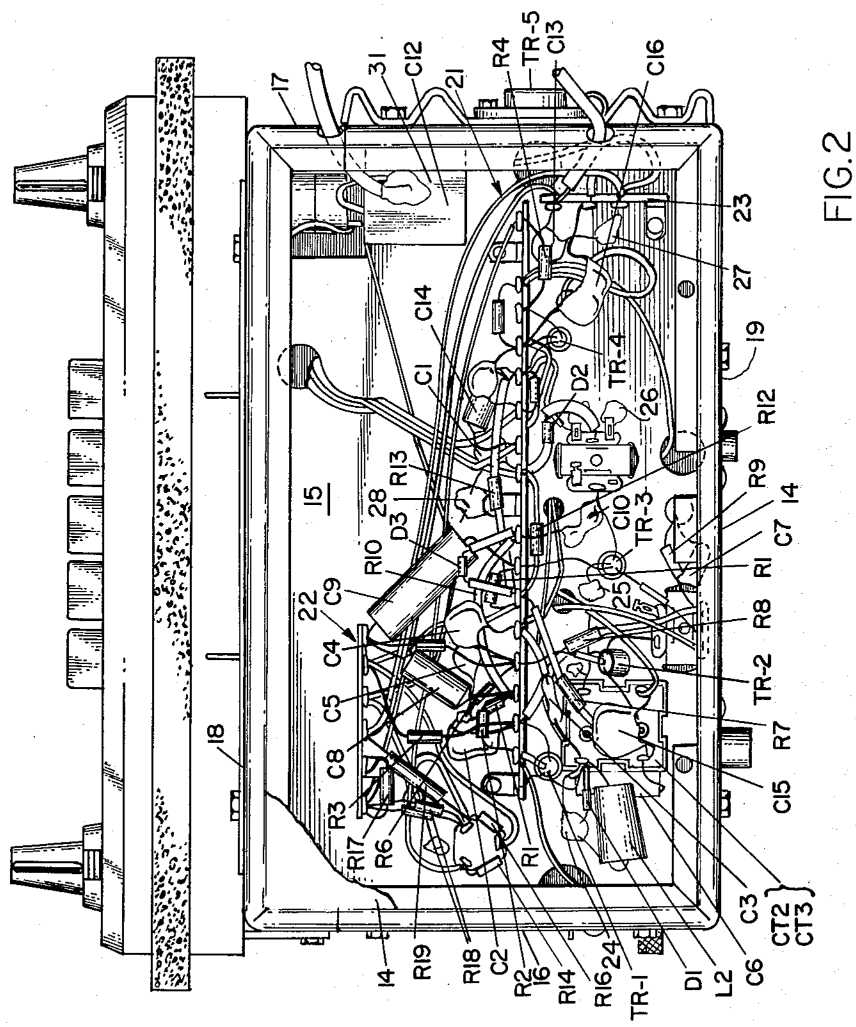
FIG. 2 is a bottom view of the chassis illustrating the novel layout.

Referring to FIG. 2, there is shown a pictorial view of the novel radio receiver with the bottom plate 14 cut away to expose the internal arrangement of transistors and other circuit components according to the invention.

The chassis includes a rigid top plate 15 with side plates 16 and 17, front plate 18 and back plate 19 extending perpendicularly from top plate 15 to define a shielded volume between bottom plate 14 and top plate 15 in which all the radio frequency transistors are located along with most of the circuit components.

A long terminal strip 21 is secured to top plate 15 and supports a row of terminals in the vicinity of and generally parallel to the center line of top plate 15 for most of the length of the plate. A second terminal strip 22 extends parallel to terminal strip 21 and supports another shorter row of terminals near the front plate 18. A third terminal strip 23 at the end of strip 21 near side plate 17 may be added to provide additional terminals. This strip is located on the side of center terminal strip 21 nearest back plate 19. The terminals of I.-F. transformer T1 and I.-F. transformer T2 are seen to extend through the underside of top plate 15 on the side of the center terminal strip 21 nearest back plate 19.

At least top plate 15 is preferably made of cadmium plated, zinc plated or hot tin coated steel to provide good electrical shielding and mechanical strength while facilitating establishing ground connections by soldering directly to top plate 15 of the chassis at points such as 24—28. Soldering directly to the chassis eliminates the cost and space requirements of a ground lug and provides better mechanical and electrical ground connections to insure top performance in the presence of severe vibration.

Plate 31 is fastened to top plate 15 by a suitable insulating adhesive resin so that it is insulated from top plate 15 to coact therewith and form capacitor C12. This is known as a spark plate which coacts with top plate 15 to form capacitor C12 for bypassing ignition noise and other interference to ground.

Arranging the different terminals as shown and described maximizes the clear space available for accommodating the different circuit components without crowding. As a result, assembly by mass production techniques is greatly simplified to reduce assembly cost, time and errors. And arrangement of components affords ready access to each component so that repairs, when occasionally necessary, may be quickly and easily made without damaging other components.

Another feature of the arrangement resides in directly soldering all the radio frequency transistor leads to the different terminals in the shielded volume beneath the top plate 15. This arrangement of transistors has a number of advantages. First, the cost of and required space for transistor sockets are eliminated. In addition, excellent electrical contact is consistently maintained between the transistor elements and the associated circuit components while the transistors are securely supported mechanically, despite severe mechanical vibrations encountered by automobile radio receivers. Furthermore, locating the transistors in the shielded volume as shown close to the top plate 15 results in a high degree of circuit stability. This permits the gain to be maximized so that fewer stages of amplification are required, thereby further reducing costs. It is believed that although conventional I.-F. transformers are shielded, this shielding is not complete and enough energy may escape to establish undesired oscillations in a high gain stage. By locating the transistors and the shielded I.-F. transformers on opposite sides of the top plate, it is believed that additional electrical isolation is effected between transistors and transformer-established space fields so that chances of amplifier oscillation are appreciably reduced, despite the high gain of each stage of amplification. In addition, placing the transistors beneath the top plate simplifies the task of shielding the circuitry from ignition interference and other undesired signals because the same bottom plate which covers the circuit components beneath the top plate also completes the shielding of the radio frequency transistors.

Figure 3:
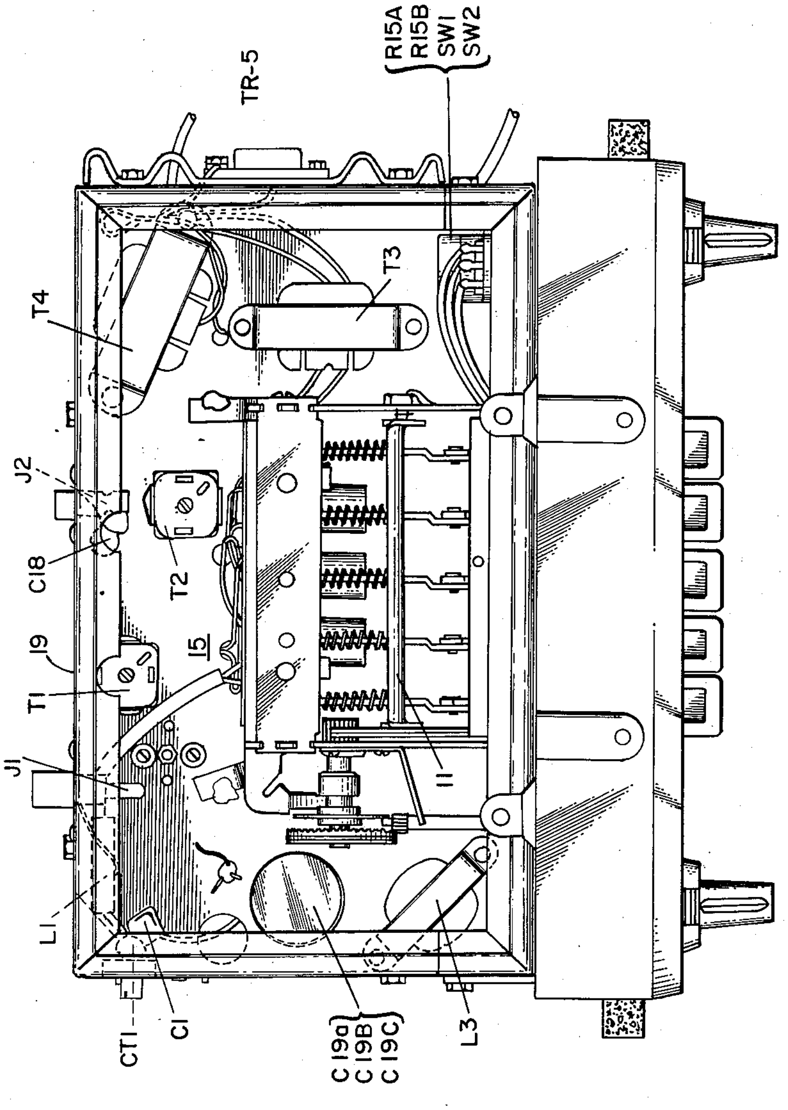
FIG. 3 is a top view of the chassis with the layout according to the invention.

Referring to FIG. 3, there is shown a top view of the receiver whose underside is shown in FIG. 2. Note that both I.-F. and audio transformers are located on the top side of top plate 15. Thus, plate 15 helps to shield all the transistors in stages before the power output stage from transformer-established fields.

The specific details of the physical interconnections of elements among terminals has not been described in detail since the pictorial representations of FIGS. 2 and 3 together with the schematic circuit diagram of FIG. 1 is sufficient to enable one skilled in the art to lay out a transistorized automobile radio receiver in accordance with the inventive concepts to derive the benefits of high sensitivity, high selectivity, high stability, insensitivity to interfering signals, ease of assembly, servicing ease, mechanical ruggedness and low cost.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:

1. A fully transistorized vehicular radio receiver comprising, a substantially rigid chassis of conducting material having a top plate of relatively large area and a plurality of side plates generally perpendicular to and on the same side of said top plate for enclosing all but one side of an electrically shielded volume defined by said chassis, a center row of terminals extending from said top plate on said same side thereof generally parallel to the lengthwise centerline of said top plate along a strip of said top plate including said centerline for most of its length, at least one other row of terminals extending from said top plate on said same side thereof generally parallel to said center row for less than half the length of said plate, I.-F. transformers all extending from said top plate on the other side of said top plate with only the terminals of said transformers extending from said top plate on said same side, a shield surrounding each I.-F. transformer, ground terminals contacting said chassis, a plurality of radio frequency circuits comprising, resistors, capacitors, inductors, transistors and semiconductor diodes interconnecting, soldered to and supported by said terminals and located within said shielded volume, and a bottom conducting plate secured to said side plates and covering said all but one side, all the transistors in the radio frequency circuits of said receiver being located within said electrically shielded volume and shielded from said I.-F. transformers by means including both said top plate and said I.-F. transformer shields.

2. A fully transistorized vehicular radio receiver in accordance with claim 1 wherein said center row separates said other row from all said I.-F. transformer terminals.

3. A fully transistorized vehicular radio receiver in accordance with claim 2 and further comprising, A.-F. transformers all extending from said top plate solely on said other side thereof, and an audio frequency amplification stage comprising an audio frequency transistor located entirely within said shielded volume.

4. A fully transistorized vehicular radio receiver in accordance with claim 3 and further comprising, an audio frequency power amplification stage comprising a power transistor secured to one of said side plates in good thermal contact therewith outside said shielded volume, said one side plate being aluminum.

5. A fully transistorized vehicular radio receiver in accordance with claim 4 having only five transistors consisting of said audio frequency transistor, said power transistor, a single transistor providing I.-F. amplification, a single transistor providing R.-F. amplification, and a single transistor coacting with a plurality of said resistors, capacitors and inductors to function as a mixer-oscillator.

6. A fully transistorized vehicular radio receiver comprising, a substantially rigid chassis of conducting material having a top plate with top and bottom sides of relatively large area, a center row of terminals extending from said bottom side along a lengthwise strip thereof spaced from the edges of said plate, the length of said center row embracing most of the length of said top plate, at least one other row of terminals spaced from said center row and facing said bottom side, I.-F. transformers all extending from said top side with the terminals of said I.-F. transformers extending from said bottom side, a shield surrounding each I.-F. transformer, ground terminals contacting said chassis, and a plurality of radio frequency circuits comprising resistors, capacitors, inductors, transistors and semiconductor diodes interconnecting, soldered to and supported by a plurality of said terminals, said top plate supporting said strip and coacting with said I.-F. transformer shields for shielding radio frequency transistors from said I.-F. transformers.

7. A fully transistorized vehicular radio receiver in accordance with claim 6 and further comprising, A.-F. transformers extending from said top side, and an audio frequency amplification stage comprising an audio frequency transistor interconnecting and supported by a plurality of said terminals.

8. A fully transistorized vehicular radio receiver in accordance with claim 7 and further comprising, an audio frequency power amplification stage comprising a power transistor secured to said chassis in good thermal contact therewith, said receiver having only five transistors consisting of said power transistor, said audio frequency transistor, a single transistor providing I.-F. amplification, a single transistor providing R.-F. amplification and a single transistor coacting with a plurality of said resistors, capacitors and inductors to function as a mixer-oscillator.

9. A fully transistorized vehicular radio receiver in accordance with claim 8 wherein said chassis further comprises side plates, and further comprising a bottom conducting plate in conductive contact with said chassis and coacting with said top plate and said side plates to define a shield volume enclosing said terminals.

References Cited in the file of this patent

UNITED STATES PATENTS

| | | |
|---|---|---|
| 1,909,685 | Kenney | May 16, 1933 |
| 2,361,187 | Foster | Oct. 24, 1944 |
| 2,938,130 | Noll | May 24, 1960 |
| 2,964,621 | Foltyn | Dec. 13, 1960 |